United States Patent
Yabe et al.

[11] Patent Number: 5,882,264
[45] Date of Patent: Mar. 16, 1999

[54] SPRING DAMPER DEVICE SUITABLE FOR USE IN LOCKUP CLUTCH OF TORQUE CONVERTER

[75] Inventors: Hiroshi Yabe; Shiro Takeuchi, both of Shizuoka-ken, Japan

[73] Assignee: NSK-Warner K.K., Tokyo, Japan

[21] Appl. No.: 764,085

[22] Filed: Dec. 6, 1996

[30] Foreign Application Priority Data

Dec. 8, 1995 [JP] Japan .................................. 7-348961

[51] Int. Cl.⁶ ................................................ F16D 3/14
[52] U.S. Cl. .......................... 464/64; 192/203; 267/168; 464/66
[58] Field of Search ................... 464/64, 66, 68; 192/203, 213; 267/168, 170, 179

[56] References Cited

U.S. PATENT DOCUMENTS

| | | | |
|---|---|---|---|
| 190,582 | 5/1877 | Hansell | 267/168 X |
| 2,001,835 | 5/1935 | Cook | 267/168 X |
| 3,030,056 | 4/1962 | Rogers | 267/168 X |
| 4,427,400 | 1/1984 | Lamarche | 464/64 |
| 4,499,981 | 2/1985 | Nagano | 192/203 |
| 4,591,349 | 5/1986 | Takeuchi et al. | 464/66 X |
| 4,810,231 | 3/1989 | Weissenberger et al. | 464/68 |
| 4,907,788 | 3/1990 | Balsells | 267/168 |
| 4,947,700 | 8/1990 | Kern et al. | 192/203 X |
| 5,203,546 | 4/1993 | Amadore | 267/168 |

*Primary Examiner*—Eileen Dunn Lillis
*Attorney, Agent, or Firm*—Evenson, McKeown, Edwards & Lenahan, P.L.L.C.

[57] ABSTRACT

A spring damper device includes cylindrical outer coil springs and inner springs inserted in the outer coil springs, respectively. The cylindrical outer coil springs are held in the form of arcs of a circle at angular intervals therebetween by a retainer plate, whereas the inner springs have a length shorter than the outer coil springs so that the inner springs are actuated a predetermined angle later compared with their corresponding outer coil springs. Each of the inner springs has a diameter smaller at opposite end portions thereof than at a central portion thereof.

20 Claims, 6 Drawing Sheets

SPRING DAMPER DEVICE SUITABLE FOR USE IN LOCKUP CLUTCH OF TORQUE CONVERTER

BACKGROUND OF THE INVENTION a) Field of the Invention

This invention relates to a spring damper device for use in a lockup clutch of a torque converter.

b) Description of the Related Art

FIG. 1 is a cross-sectional view showing a basic construction of a torque converter equipped with a lockup clutch. FIG. 2 is an illustration as viewed in the direction of arrows II—II of FIG. 1. In these drawings, there are shown a torque converter main body 10, a centering portion 1 of an engine power output shaft, a pump 2, a turbine 3, a stator 4, a turbine hub 5 of the torque converter, an axis 6, a power input casing 21 connecting the engine power output shaft and the pump 2 with each other, a piston 22 axially movable on the hub 5 and acting as a clutch plate, a retainer plate 23 fixed on the piston 22 by rivets 26, and tabs 24 located inside a spring 32 which is arranged on an inner peripheral side of an outer peripheral flange 28 of the piston 22. These tabs 24 have been formed by radially slitting a peripheral portion of the retainer plate 23 at predetermined angular intervals and bending out every second slitted peripheral portions. Designated at numeral 25 are spring end face support members which are located radially outside the retainer plate 23 and are bent into turned square U-shapes with the open faces of the Us rendered broader. Numeral 33 indicates caps in which end portions of the corresponding springs 32 are received, respectively. Numeral 27 indicates a friction member of the clutch.

A driven plate 31 is arranged opposite the end face supporting members 25. Incidentally, a portion indicated by sign 32A in an upper part of FIG. 2 indicates that the spring 32 has been compressed, its caps 33 have already been brought into contact with each other and the spring 32 cannot be compressed any further. On the other hand, at another portion indicated by sign 32B in a lower part of FIG. 2, the tab 24 is omitted, and the spring and its associated caps are shown in cross-section.

A description will next be made about the operation of the torque converter equipped with the lockup clutch. Now assume that a hydraulic pressure is applied on a right side of the piston 22. Then the piston 22 is moved leftwards and is brought into contact under pressure with the power input casing 21. Rotation of the piston 22 is hence transmitted to the turbine 3 via the end face supporting members 25, the caps 33, the springs 32 and the driven plate 31. As the turbine 3 is fixedly mounted on the turbine hub 5, a power output shaft (not shown) is rotated by way of an unillustrated power output hub.

Variations in torque are absorbed at the springs 32. Each spring 32 is positioned between its associated end face supporting members 25 and is also prevented from axial dislocation by the associated tab 24.

Further, as is illustrated in FIG. 3, it has also been contemplated to form each spring 32, which is arranged for the absorption of torque variations, as a double coil spring formed of an inner spring 32X and an outer spring 32Y and further to make the inner spring 32X shorter to delay its actuation, thereby providing the double coil spring with two-step damping characteristics. There is also a modification that linear cylindrical springs are set in the form of arcs of a circle to save a space for their arrangement.

In the case of double coil springs such that, as is shown in FIG. 3, each outer spring 32Y is inserted between spacers 34, which are in turn positioned between the associated two end face supporting members 25, and the corresponding shorter inner spring 32X is inserted in the outer spring 32Y, it is designed to hold each outer spring 32Y in a curved form or to allow each outer spring 32Y to flex into a curved form under a centrifugal force during rotation. In such a conventional device, however, an inconvenience arises as shown in FIG. 4 and FIG. 5 which is an enlarged view of a part A of FIG. 4. Namely, opposite end portions of each linear inner spring 32X may enter spaces between pitches of the associated outer spring 32Y during an operation so that the opposite end portions of the linear inner spring 32X may ride on the associated outer spring 32Y. This leads to unstable damping characteristics and hence to a shorter service life.

SUMMARY OF THE INVENTION

To overcome the foregoing problems, the present invention provides a spring damper device suitable for use in a lockup clutch of a torque converter, said spring damper device including:

cylindrical outer coil springs held in the form of arcs of a circle at angular intervals therebetween by a retainer plate, and inner springs inserted in said outer coil springs, respectively, and having a length shorter than said outer coil springs so that said inner springs are actuated a predetermined angle later compared with their corresponding outer coil springs, the improvement wherein:

each of said inner springs has a diameter smaller at opposite end portions thereof than at a central portion thereof.

Owing to the above construction, it is only necessary to make each inner spring smaller in diameter at the opposite end portions thereof than at the central portion thereof. No particular machining or processing is therefore required upon fabrication of the springs. The spring damper device according to the present invention can eliminate or at least substantially eliminate the above-described drawbacks and can obtain stable damping characteristics with an improved service life. It is also possible to avoid damages which would otherwise occur due to malfunctioning of springs.

DETAILED DESCRIPTION OF THE INVENTION AND PREFERRED EMBODIMENT

Figure 6:
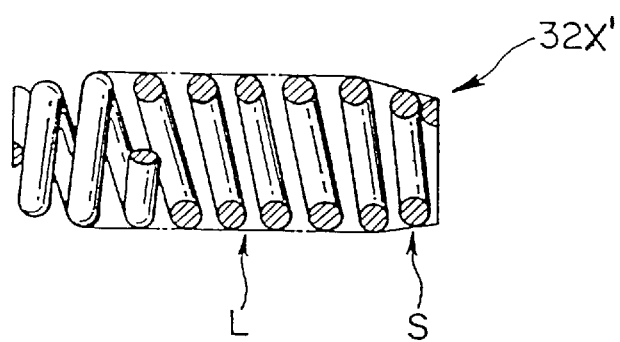
FIG. 6 is a fragmentary, partly cross-sectional view of an inner spring useful in a spring damper device according to one embodiment of the present invention.

Referring first to FIG. 6, a description will be made of the inner spring useful in the spring damper device according to one embodiment of the present invention. In the inner spring designated generally by sign 32X' in FIG. 6, small-diameter portions S located at opposite ends of the inner spring 32X' are gradually reduced in diameter over a few pitches compared with a central large-diameter portion L.

Figure 7:
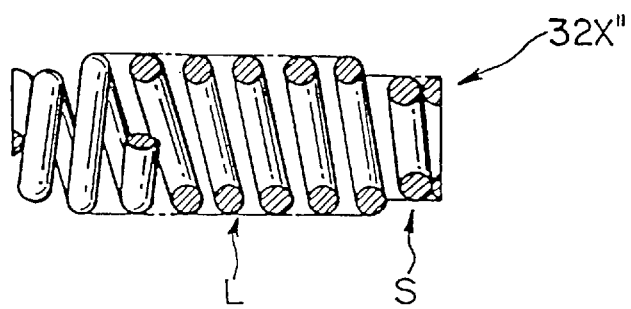
FIG. 7 is similar to FIG. 6 but illustrates a modification of the inner spring.

In the modification shown in FIG. 7, small-diameter portions S are located over a few pitches at opposite ends of the inner spring 32X'. In each small-diameter portion S, the diameter remains unchanged over the few pitches.

Figure 8:
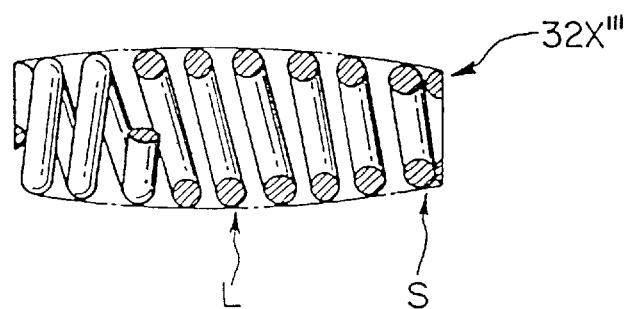
FIG. 8 is similar to FIG. 6 but illustrates another modification of the inner spring.

In the further modification illustrated in FIG. 8, the inner spring 32X' is formed so that its coil diameter gradually become smaller from a central large-diameter portion L toward small-diameter portions S located at opposite ends of the inner spring 32X.

Figure 9:
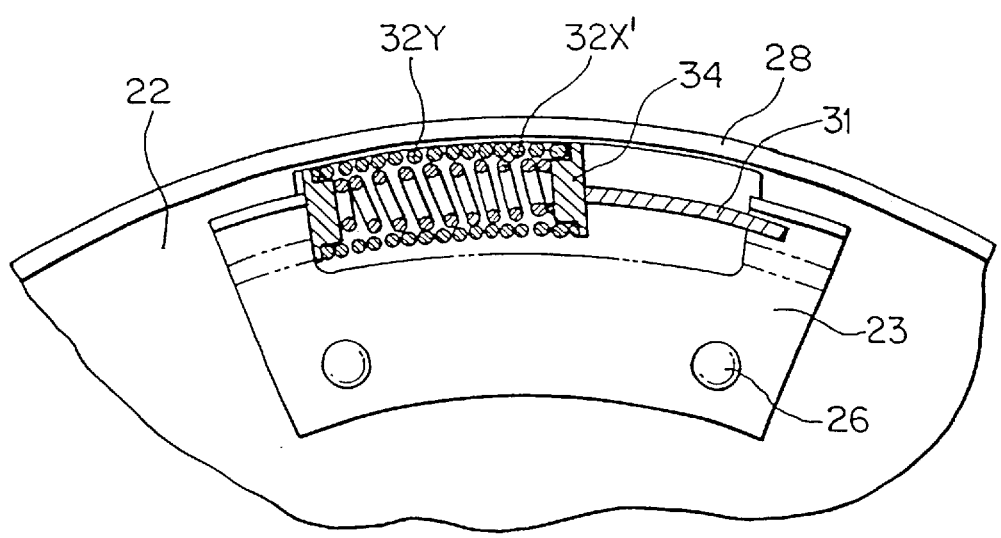
FIG. 9 is a fragmentary cross-sectional view of the spring damper device according to the one embodiment of the present invention, in which the double spring is in a compressed state.

Referring next to FIG. 9, a description will be made of the construction and operation of the spring damper device equipped with the inner springs 32X shown in FIG. 6. Each outer spring 32Y is held in place in the form of an arc of a circle on an inner side of an outer peripheral flange 28 of the piston 22 by the retainer plate 23. The inner spring 32X has a shorter length than the outer spring 32Y, is wound in a direction opposite to the outer spring 32Y and is movably inserted within the outer spring 32Y.

Upon transmission of a torsional torque from the piston 22 to the driven plate 31 via the retainer plate 23 and the outer springs 32Y, the formation of the inner spring 32X' in a smaller coil diameter at both the end portions S thereof than at the central portion L thereof has made it possible to prevent the end portions of the inner spring 32X' from riding on the outer spring 32Y as shown in FIG. 9, thereby providing stable characteristics and also an improvement in service life.

Figure 1:
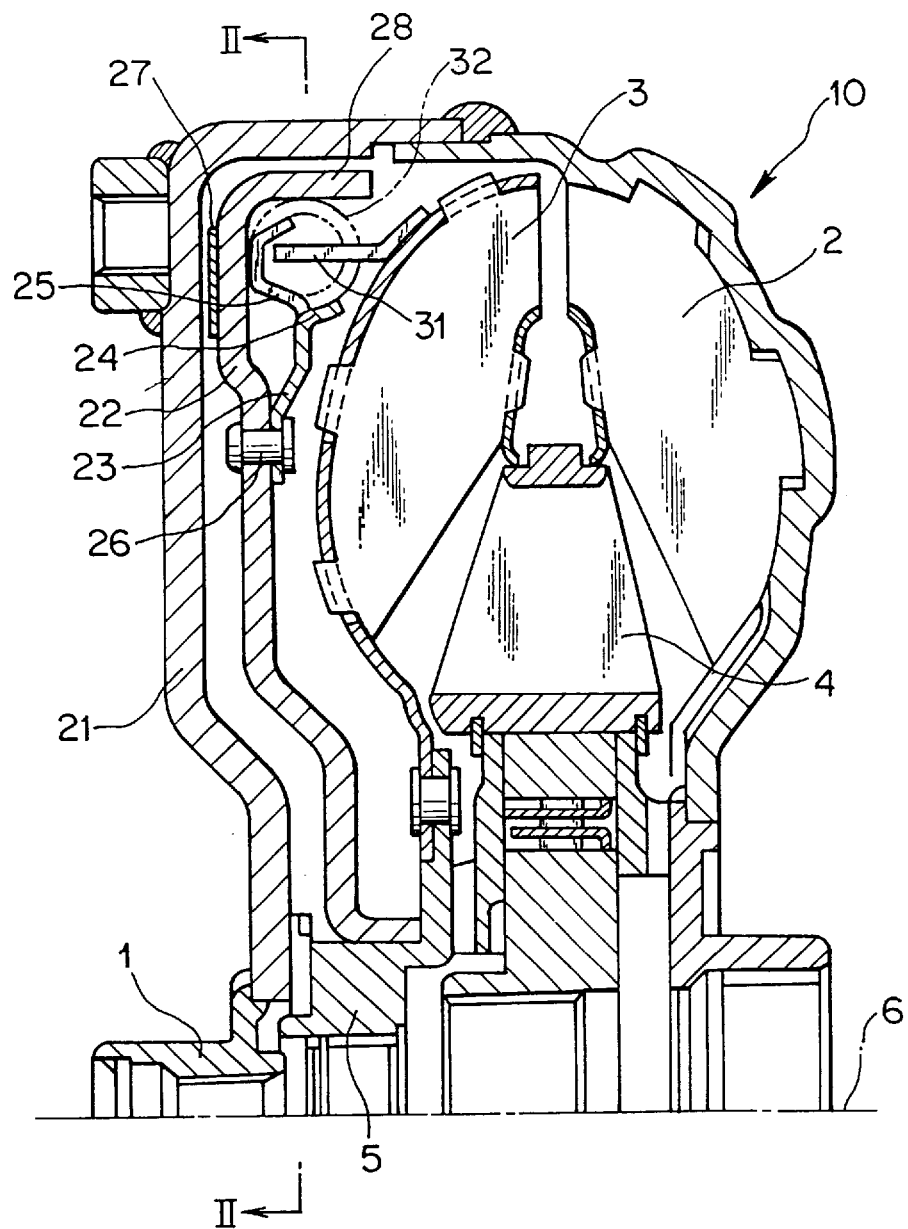
FIG. 1 is the cross-sectional view showing the basic construction of the torque converter equipped with the lockup clutch.
Figure 2:
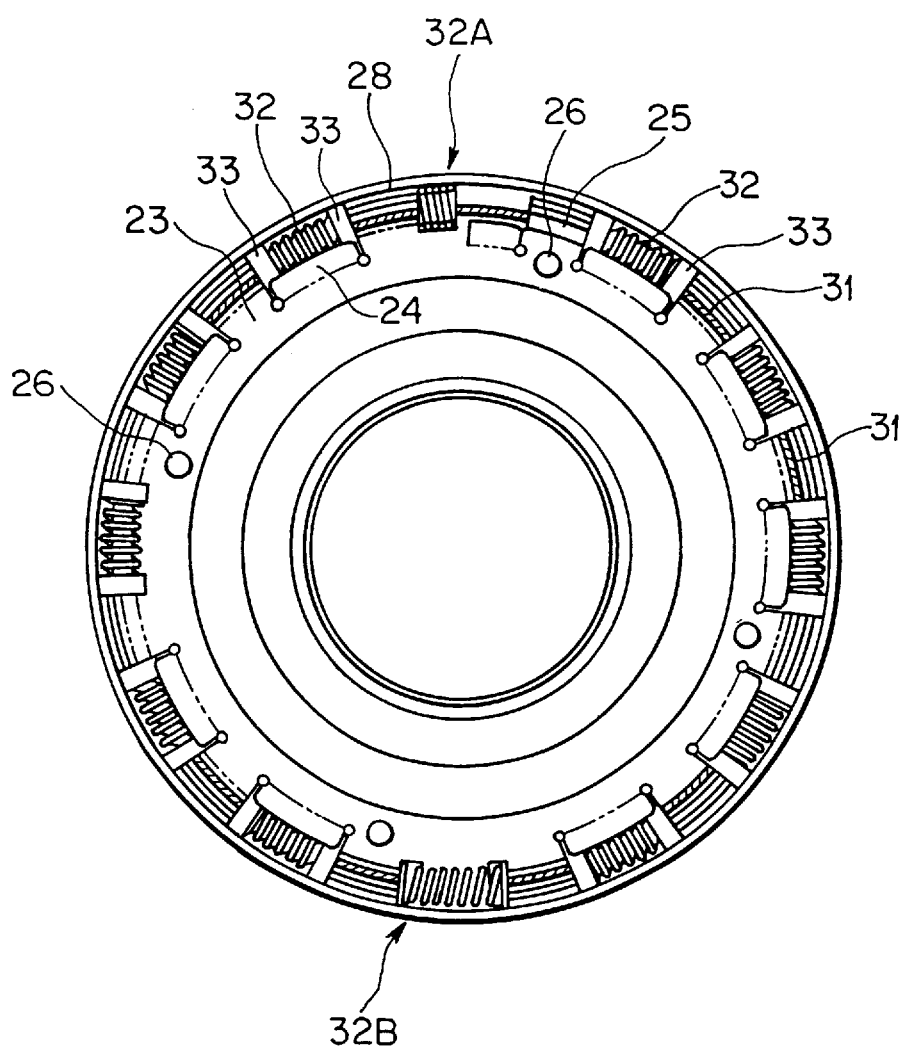
FIG. 2 is the illustration as viewed in the direction of the arrows II—II of FIG. 1.
Figure 3:
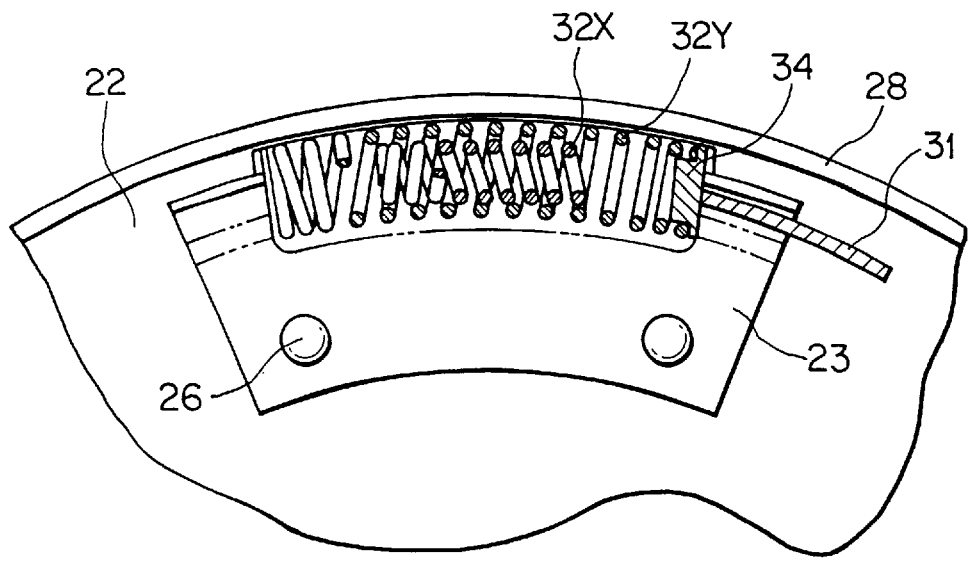
FIG. 3 is the fragmentary cross-sectional view showing the construction of the conventional double spring.
Figure 4:
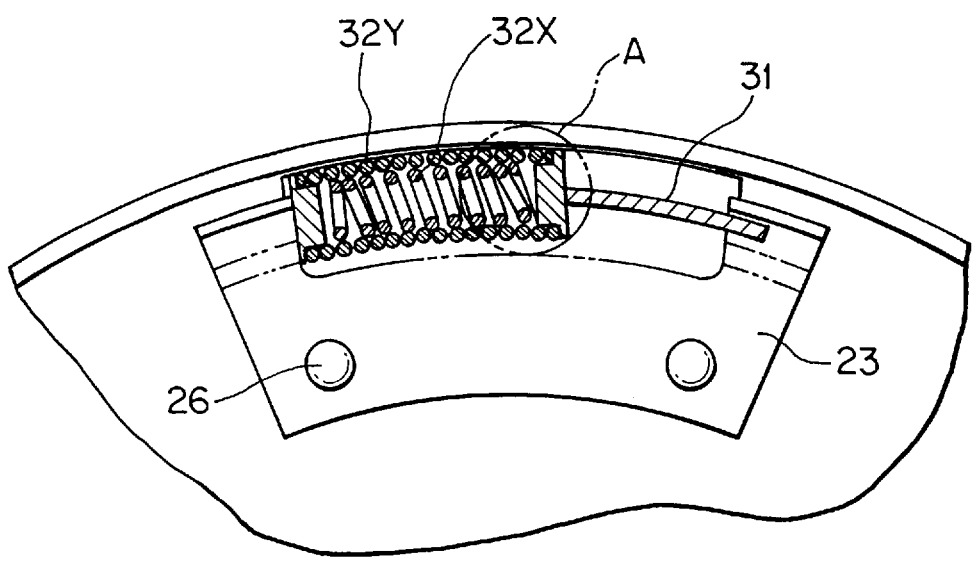
FIG. 4 is similar to FIG. 3 but shows the conventional double spring in a compressed state.
Figure 5:
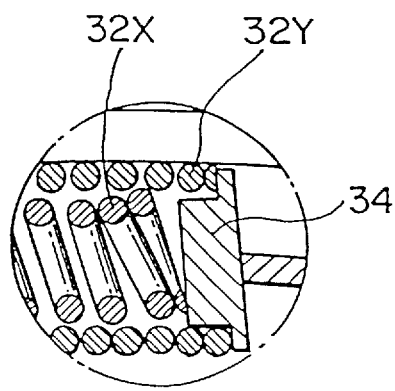
FIG. 5 is the enlarged view of the encircled part A of FIG. 4.
Figure 10:
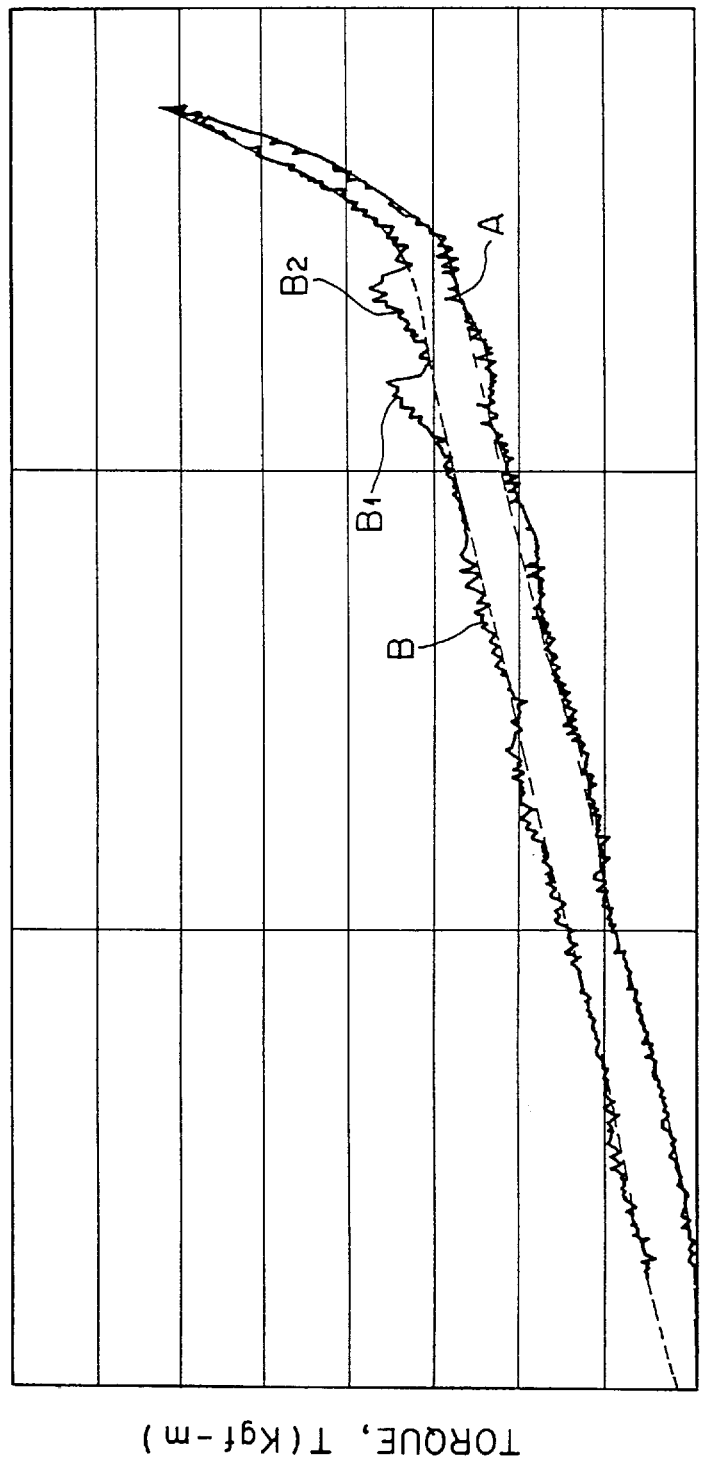
FIG. 10 is a diagram showing a waveform of a torque damped through the spring damper device according to the one embodiment of the present invention during rotation in comparison with that of a torque damped through the conventional spring damper device shown in FIGS. 3 through 5 during rotation.

FIG. 10 diagrammatically illustrates damper torque waveforms during rotation, in which torques T (kgf-m) are plotted along the abscissa while angles of torsion ($\alpha$) of the damper are plotted along the ordinate. The damper torque waveform B corresponds to the conventional spring damper device shown in FIGS. 3 through 5. Due to riding of the inner spring 32X' on the outer spring 32Y, abnormal waveform portions appear as shown at $B_1$ and $B_2$ so that characteristics become unstable. In contrast, a waveform corresponding to the spring damper device according to the one embodiment of the present invention shown in FIG. 6 is indicated by the waveform A and is appreciated to show stable characteristics.

We claim:

1. In a spring damper device suitable for use in a lockup clutch of a torque converter, said spring damper device including:

cylindrical outer coil springs held in the form of arcs of a circle at angular intervals therebetween by a retainer plate, and inner springs inserted in said outer coil springs, respectively, and having a length shorter than said outer coil springs so that said inner springs are actuated later than the corresponding outer coil springs after rotation through a predetermined angle, the improvement wherein:

each of said inner springs has a diameter smaller at opposite end portions thereof than at a central portion thereof.

2. A spring damper device according to claim 1, wherein said diameter becomes gradually smaller over a few pitches at each of said end portions.

3. A spring damper device according to claim 1, wherein said diameter remains unchanged over a few pitches at each of said end portions.

4. A spring damper device according to claim 1, wherein said diameter becomes gradually smaller from said central portion toward each of said end portions.

5. A spring damper device according to claim 1, wherein said inner springs are made of wire having a constant cross section.

6. A spring damper device for a lockup clutch of a torque converter, said spring damper device comprising:

cylindrical outer coil springs held in the form of arcs of a circle at angular intervals therebetween by a retainer plate, and inner springs inserted in said outer coil springs, respectively, and having a length shorter than said outer coil springs so that said inner springs are actuated later than the corresponding outer coil springs after rotation through a predetermined angle, said inner springs being wound in a direction opposite to said outer coil springs, each of said inner springs having a diameter smaller at opposite end portions thereof than at a central portion thereof.

7. A spring damper device according to claim 6, wherein said diameter remains unchanged over a few pitches at each of said end portions.

8. A spring damper device according to claim 6, wherein said diameter becomes gradually smaller from said central portion toward each of said end portions.

9. A spring damper device according to claim 6, wherein each of said inner springs is unsupported at said opposite end portions.

10. A spring damper device according to claim 6, wherein said diameter becomes gradually smaller over a few pitches at each of said end portions.

11. A spring damper device according to claim 6, wherein said inner springs are made of wire having a constant cross section.

12. A spring damper device comprising:

a plurality of cylindrical outer coil springs held by a retainer plate, and a plurality of inner coil springs inserted in said outer coil springs, respectively, said inner coil springs having a length shorter than said outer coil springs, each of said inner coil springs having a diameter smaller at opposite axial end portions thereof than at an axially central portion thereof.

13. A spring damper device according to claim 12, wherein said diameter remains unchanged over a few pitches at each of said axial end portions.

14. A spring damper device according to claim 12, wherein said diameter becomes gradually smaller from said central portion toward each of said axial end portions.

15. A spring damper device according to claim 12, wherein said inner springs are wound in a direction opposite to said outer coil springs.

16. A spring damper device according to claim 15, wherein each of said inner springs is unsupported at said axial opposite end portions.

17. A spring damper device according to claim 12, wherein each of said inner springs is unsupported at said opposite axial end portions.

18. A spring damper device according to claim 12, wherein said cylindrical outer coil springs are held in the form of arcs of a circle by said retainer plate.

19. A spring damper device according to claim 12, wherein said diameter becomes gradually smaller over a few pitches at each of said axial end portions.

20. A spring damper device according to claim 12, wherein said inner coil springs are made of wire having a constant cross section.

* * * * *